United States Patent [19]

Jaffe

[11] 4,371,642
[45] Feb. 1, 1983

[54] PROCESS FOR PREPARING POLYOLEFIN RESIN EXTENDED PIGMENTS

[75] Inventor: Edward E. Jaffe, Wilmington, Del.

[73] Assignee: E. I. Du Pont de Nemours and Company, Wilmington, Del.

[21] Appl. No.: 281,195

[22] Filed: Jul. 7, 1981

[51] Int. Cl.³ .................. C08K 5/56; C09B 48/00; C09B 47/04; C08K 5/34

[52] U.S. Cl. .................. 524/88; 106/288 Q; 106/309; 523/351; 523/205; 524/90; 524/562; 524/563; 524/570; 524/581

[58] Field of Search .......... 260/42.21, 37 M; 106/288 Q, 309; 524/88, 90, 423, 570, 581, 563, 562; 523/351

[56] References Cited

U.S. PATENT DOCUMENTS

| | | | |
|---|---|---|---|
| 2,539,429 | 1/1951 | Jensen | 106/262 |
| 2,544,636 | 3/1951 | Peck | 260/34.2 |
| 2,649,382 | 8/1953 | Vesce | 106/193 |
| 3,577,254 | 5/1971 | Petke | 260/42.21 |
| 3,586,654 | 6/1971 | Lerman et al. | 260/42.21 |
| 3,705,816 | 12/1972 | Zwahlen et al. | 106/308 |
| 3,755,244 | 8/1973 | Hart | 260/42.21 |
| 3,806,464 | 4/1974 | Matrick et al. | 252/316 |
| 3,925,096 | 12/1975 | Karkov | 106/309 |
| 4,025,480 | 5/1977 | Larson | 260/42.21 |
| 4,116,924 | 9/1978 | Peabody | 260/42.21 |
| 4,260,424 | 4/1981 | Mizoguchi et al. | 106/309 |
| 4,287,000 | 9/1981 | Buckwalter | 106/309 |

FOREIGN PATENT DOCUMENTS

| | | |
|---|---|---|
| 554960 | 3/1958 | Canada . |
| 895751 | 5/1962 | United Kingdom . |
| 1085680 | 6/1966 | United Kingdom .......... 106/288 Q |
| 1431636 | 4/1976 | United Kingdom . |

*Primary Examiner*—John C. Bleutge
*Assistant Examiner*—Herbert J. Lilling

[57] ABSTRACT

A process is disclosed for preparing resin extended pigments containing from 10% to 75% and preferably 25% to 50% by weight, based on the amount of pigment and resin present. The crude pigment and resin are premilled dry, such as in a ball mill, in a manner equivalent to that used to prepare small particle size highly aggregated pigment. Following premilling the pigment and resin are milled in an organic liquid capable of ripening the pigment particles to pigmentary size or simply improving their crystallinity which organic liquid at 30° C., can dissolve no more than 5 g/l and preferably no more than 2 g/l of the resin.

8 Claims, No Drawings

PROCESS FOR PREPARING POLYOLEFIN RESIN EXTENDED PIGMENTS

BACKGROUND OF THE INVENTION

1. Field of the Invention

The present invention relates to a process for the production of resin extended pigments which exhibit improved dispersibility over the corresponding nonresin extended pigment in a variety of plastics applications.

Pigments are widely used in various types of polymeric media. The efficiency of a pigment as a color imparting substance is very dependent on the degree of pigment dispersion achieved in these media. Generally pigments are products having a very small particle size with a consequent tendency to form aggregates during their preparation. This tendency to form aggregates is particularly troublesome during the drying step used in the preparation of pigments. In order to overcome this tendency to form aggregates various methods have been used to prevent or minimize the formation of aggregates and thus enhance dispersibility of the pigment involved.

2. Prior Art

U.S. Pat. No. 2,539,429 discloses comilling a pigment and a water insoluble resin in the presence of a water miscible solvent for the resin. The solvent is then removed with water.

U.S. Pat. No. 2,544,636 discloses comilling a pigment and a resin in the presence of a solvent for the resin to produce a free flowing pigment base.

U.S. Pat. No. 2,649,382 discloses a process wherein a pigment and a soluble resin are comilled with a mixture of water and a water miscible solvent for the resin.

U.S. Pat No. 3,705,816 discloses grinding a pigment, a cellulose ester and a water miscible organic solvent for the cellulose ester.

U.S. Pat. No. 3,806,464 discloses a process for preparing a pigment encapsulated with an acrylic interpolymer by comilling the pigment, the acrylic interpolymer and a solvent for the acrylic interpolymer. After the comilling step the solvent is removed.

U.S. Pat. No. 3,925,096 discloses a process for producing a particulate resin-containing pigment composition in which an organic solvent soluble resin and pigment are comilled in the presence of an organic solvent.

Br. Pat. No. 895,751 discloses a process for forming a pigment preparation wherein a pigment is milled with a solution of a polymerization or polycondenation product followed by precipitation of the polymerization or polycondensation product.

Br. Pat. No. 1,431,636 discloses ball milling a pigment with a solution of a polyester-polyurethane to form a pigment paste.

Canadian Pat. No. 554,960 discloses milling a pigment and a plastic in the presence of water, a water miscible solvent for the plastic and a water immiscible solvent for the plastic.

SUMMARY OF THE INVENTION

In the process of the present invention a resin extended pigment having improved dispersibility and having the pigment particles reduced to pigmentary size is prepared by ball milling the crude pigment, followed by milling in the presence of resin and an organic liquid which does not dissolve the resin but which wets the surface of the pigment and can improve its crystallinity, in a preferred aspect of the invention the crude pigment is comilled with the resin followed by milling in the presence of an organic liquid.

DETAILED DESCRIPTION

The present invention is a process for the production of resin extended pigments of improved dispersibility, which process is characterized by requiring no additional steps beyond those already employed in the process of particle size reduction for a given pigment. Preferably the desired resin is simply incorporated with the pigment in the premilling particle size reduction step, which is then followed with a solvent milling step. Alternatively the resin can be added during the step of milling in the presence of an organic liquid. Thus the process of the invention involves premilling a crude pigment followed by milling the premilled pigment in the presence of an organic liquid wherein a resin is present sometime during milling. The products are highly dispersible quinacridone or copper phthalocyanine pigments which are essentially equal in dispersibility and pigmentary strength to commercial resin extended pigments which have been resin extended in a separate step after having their particle size reduced to pigmentary size.

The relative proportions of pigment and resin may vary widely depending on the intended use of the resin extended pigment. As little as 10% by weight resin, based on the resin extended pigment, has shown a distinct beneficial effect in some plastic systems. For beta copper phthalocyanine, extension with 25% by weight resin, has given a product which exhibits excellent dispersibility in polyvinyl chloride, being comparable or superior to commercially available resin extended beta copper phthalocyanine. In the case of 2,9-dimethylquinacridone, 50% by weight, based on the resin extended pigment, has shown the greatest effect in terms of dispersibility and compares favorably with commercial resin extended pigments prepared by more costly processes. In terms of convenience and cost, the amount of resin used should be minimized; but the overriding consideration is dispersibility which is maximized in general at a resin extension in the range of 10% to 75% by weight based on the resin extended pigment, and preferably from 25% to 50% by weight, based on the resin extended pigment.

A wide variety of resins can be used in the process. Generally the resin should not melt under the milling operation which is carried out at temperatures as high as 65° C. Thus, preferably the resin should have a softening point above 75° C. The resin should be thermoplastic. The resin must be stable in the dilute aqueous acid which is used to remove any metal which becomes incorporated in the resin extended pigment during the milling operation. Adequate stability in dilute acid means that the resin does not undergo significant deleterious degradation when subjected to a 1.5% solution of sulfuric acid at 90° C. for 2 hours. Any of a wide variety of resins can be used. The resin should be in a finely divided state such as a powder rather than being in the form of molding pellets.

The preferred resins generally are copolymers such as an ethylene-acrylic acid copolymer which is very compatible with many plastic systems.

The most preferred resins are low molecular polymers of ethylene which may contain up to 25% by weight of a monomer selected from the class consisting of acrylic acid, methacrylic acid, vinyl acetate and oxidized ethylene units. These preferred resins have softening points as determined by ASTM E-28 of 80° L to 140° C.

These resins are essentially insoluble in polar organic liquids and exhibit a solubility in acetone of less than 5 g per liter of solvent and preferably less than 2 g per liter of solvent at 30° C.

Premilling, as used in this invention, means milling in the complete absence of liquids or, if liquids are used, such as a phase directing solvent, or a surface-active agent, they are present in such small amounts or of such a nature that the pigment and resin retain the characteristics of a powder.

The conditions applicable to the premilling operation are not especially critical. The mill loading is substantially conventional for ball milling operations. Thus, it is conventional for the charge of grinding media to occupy about half of the volume of the mill and for the material being ground to essentially occupy the voids between these media. It is quite possible to increase the charge with some increase in the milling time. The choice of these conditions is well within the skill of one versed in this type of operation. The preferred grinding media in the mills are the rod type, but these may vary in size, and it is quite possible to use ordinary round steel balls varying from ⅛ inch in diameter up to ½ inch in diameter or more in the operation. When round balls are used there is a marked tendency for the charge to cake in the mill under some conditions, and this is often avoided by the addition of materials of an irregular shape, such as nails, to the charge. The use of the rod type grinding media usually avoids this caking.

It is impossible to set up limits as to the length of the premilling or milling cycle in the presence of an organic liquid since both will vary depending upon the pigment being treated, the mill loading, and the type of mill being used. In order to establish the optimum length of time for milling a particular pigment under a given set of conditions, it is recommended that the invention be run with variations in both milling times and that samples of the finished product be evaluated for the best balance of properties such as color strength and intensity and dispersibility. In a commercial scale mill 5 to 20 hours is usually required for each milling step. The times required in laboratory scale or semi-works mill are longer.

The preferred method of both premilling and milling in the presence of an organic liquid is ball milling. However, any milling or grinding method which utilizes an attrition and shearing action may be used. Such attrition and shearing action may be accomplished in rod mills, stirred and vibratory types of ball mills, and the like.

The preparation of resin extended or resin encapsulated pigment can also be carried out by premilling the pigment and resin in the presence of a small amount of an inorganic salt such as sodium sulfate to suppress potential explosivity of the resulting powder. This is not essential since the powder particles are highly aggregated and not very dusty.

After the premilling step the resulting mill powder is milled in the presence of an organic liquid. This milling is done in the same types of ball mills which can be used for the premilling step but preferably one uses ⅛" shot which occupy about ½ of the total mill volume. The organic liquid used will normally occupy all voids in the mill below the level of the balls or grinding elements within the mill and part of the mill above the level of the balls or grinding elements. A fully loaded mill will be approximately three quarters full.

The premilling step is generally carried out at a temperature of up to 65° C. The step of milling in the presence of an organic liquid can be carried out at from 10° to 60° C. with from 20° to 50° C. being the preferred range.

Any organic liquid which has effective wetting action on the pigment particles and can grow the particles or improve their crystallinity is acceptable. In addition, it should be sufficiently volatile to be removed by steam distillation and noncorrosive to the mill and grinding elements. A wide variety of organic liquids are suitable and vary with the nature of the pigment and its solubility. Alcohols such as methanol, isopropanol and acetone as well as other common aliphatic ketones, hydrocarbons and halogen substituted hydrocarbons such as $CCL_4$, tetrachloroethylene, and o-dichlorobenzene are suitable.

The choice of organic liquid will be influenced by the specific pigment that is to be resin extended and the nature of the resin to be used as well as cost, ease of recovery and hazzard of use. Higher boiling liquids are generally more difficult or more costly to recover by steam distillation. Other liquids such as the chlorinated hydrocarbons are toxic. On the other hand, the low boiling liquids such as acetone tend to be flammable though low on cost and relatively nontoxic. Generally the organic liquid should exert solvent action sufficient to ripen the pigment particles to pigmentary size or simply improve their crystallinity but should not exert any excessive solvating action on the pigment. Acetone, isopropanol or methanol are the preferred solvents.

The organic liquid should not dissolve more than 5 g of the resin being used per liter of solvent at 30° C., and preferably not more than 2 g of resin per liter of solvent at 30° C.

After the milling operations and the solvent distillation the resin extended pigment normally is extracted in a hot aqueous dilute acid such as 1.5% sulfuric acid to remove any metal which has become associated with the resin extended pigment during milling. Following the extraction step the pigment is dried. In conventional pigment processing most particle aggregation occurs on drying. In the present process little or no aggregation occurs during the drying step due to the presence of the resin. The presence of resin also can inhibit particle growth in the solvent milling ripening step. Notwithstanding the smaller particle size of some resin extended pigments, prepared by the process of the present invention these products are less agglomerated, more dispersible and consequently their inherent strength and transparency is easier to realize in an end use system.

Organic pigments generally are suitable for use in the process of the present invention. Such pigments include the various copper phthalocyanines including those polyhalogenated with chlorine and/or bromine, partially chlorinated alpha and chlorine free beta, and gamma phase; alpha, beta and gamma quinacridone as well as substituted quinacridones such as 2,9-dimethylquinacridone, 2,9-dichloroquinacridone, 2,9-difluoroquinacridone, 4,11-dichloroquinacridone, 4,11-difluoroquinacridone, and quinacridonequinone; solid solutions of two or more of the aforementioned quinacridones optionally with dihydroquinacridone such as described in U.S. Pat. No. 3,650,510; Indanthrone Blue, Flavanthrone, Thioindigo, and some monoazo and disazo pigments.

When extending a pigment with a resin of low polarity such as polyethylene or polyethylene modified with acrylic acid which are useful in plastic systems, the pigment coated by the resin either in the premilling or subsequent milling operation to some degree protects the pigment from the effect of the organic liquid, thus causing some particle growth retardation depending on the nature of the resin being used and thus yielding products of smaller particle size relative to a similar operation in the absence of resin. Notwithstanding the smaller particle size the pigments have outstanding dispersibility as a consequence of the resin extension.

In processing of the resin extended pigments after an equilibrium particle size has been obtained, and the final acid extraction operation carried out, filtration and washing are exceptionally rapid due to the hydrophobic nature of the resin on the surface of the pigment particles affording economics in the essential pigment isolation step.

Dispersibility in polyvinyl chloride or polyethylene of a 40% resin extended pigment such as copper phthalocyanine or 2,9-dichloroquinacridone, for example, are vastly improved over the unextended pigments, showing at minimum dispersive work greater strength and intensity but just as important fewer or no specks or streaks.

The resin extension of the present invention also improves the heat stability of some pigments which otherwise undergo a partial or complete polymorphic change under the influence of heat when being incorporated with plastics such as high density polyethylene. Thus the red solid solution of 80% quinacridone and 20% 2,9-dimethylquinacridone has a definite tendency to become progressively bluer at elevated processing temperatures due to partial phase conversion of any quinacridone, which is not in solid solution, to the violet beta-quinacridone. In the case of the resin extended pigment prepared by the process of the present invention this change is significantly reduced. The improved thermal stability is readily apparent.

DESCRIPTION OF THE PREFERRED EMBODIMENTS

In the following Examples all parts are by weight.

EXAMPLE I

A semi-works scale ball mill is charged with 30 parts of a crude semi-chlorinated copper phthalocyanine pigment containing 4.5% by weight chlorine (obtained by the reaction of 4-chlorophthalic acid and phthalic anhydride with urea and cuprous chloride) along with 20 parts of an ethylene/acrylic acid copolymer having a softening point of 108° C., a density of 0.93 g/cc, a Brookfield viscosity at 140° C. of 500 cps (0.5 Pa.s), an acid number of 40 mg KOH/g, and a solubility in acetone at 30° C. of less than 1 g per liter. The mill has previously been charged with 1000 parts of "Cyl-Pebs" steel cylinders approximately ½" (1.27 cm) in diameter and ½" (1.27 cm) in length, and 100 parts of "Twenty Penny" 4" (10 cm) long nails. To suppress the explosivity of the resulting powder 5 parts of anhydrous sodium sulfate is also added. The mill is rotated at 74% of the critical speed (critical speed is the speed at which centrifugal force overcomes the force of gravity and the grinding medium remains against the wall of the mill) for 15 hours, after which the contents of the mill is discharged through a screen which retains the "Cyl-Pebs" and nails. A portion of the resulting mill powder (0.49 part) is charged into a laboratory scale ball mill containing 10.6 parts ⅛" (0.32 cm) diameter steel shot and 1.74 parts acetone. The mill is rotated at about 75% of the critical speed for 72 hours. The mill is discharged on a screen which retains the steel shot using sufficient additional acetone to collect all of the pigment slurry from the mill. Steam is passed through the slurry until the temperature reaches 95° C. After holding the temperature at 95° C. for 10 minutes all of the acetone is removed. The slurry is cooled to 85° C. and to it is added 261 parts of 33% sulfuric acid, the resulting slurry is heated at 80°-85° C. for 1 hour. The product is collected by filtration, washed free of acid and dried at 80° C. The resulting powder is made uniform and passed through a 20 mesh screen (U.S. Sieve Series).

The product is characterized by outstanding dispersibility in low density polyethylene when tested in the following manner. Film grade low density polyethylene (0.386) is added to a two roll mill, having two six inch (15 cm) rolls which are rotated at surface speeds of 35 and 45 feet per minute (10.7 and 13.7 meters per minute), respectively and are heated to 60° C. and 120° C. respectively. When the low density polyethylene has softened, a previously prepared hand stirred mixture of 0.055 parts of powdered low density polyethylene and 0.0022 part (on a toner basis) of the resin extended pigment prepared above is added and the material thoroughly incorporated by milling for 50-60 seconds. The charge is given 5 alternate cuts and the material is taken off the mill, allowed to cool and small exhibits (3" to 4") (7.6 cm to 10 cm) are cut from the center of the resulting sheet. The remainder of the sheet is returned to the mill for an additional 5 alternate cuts and an exhibit cut out. The same is repeated for 15 and 20 total cuts. The exhibits are separately pressed in a 3" by 5" (7.62 cm by 12.7 cm), 20 mil (0.05 cm) mold at 174° C. using polyethylene terephthalate film between the low density polyethylene and the metal of the mold. The pressed material is cooled before the film is removed. The resulting exhibits are visually examined under a microscope. The pigment is completely dispersed showing no appreciable amounts of visible particles and is fully equivalent to a commercial resin extended pigment prepared by a different and costlier method.

A product prepared in a similar manner, but with a pigment which has not been resin extended shows large undispersed pigment aggregates.

The pigment can also be evaluated by determining the tinctorial strength of the pigment when dispersed in low density polyethylene. Low density polyethylene (0.44 part) is added to the two roll mill but the front roll is heated to 138° C. and the rear roll to 121° C. rotating at 45 and 35 feet per minute (13.7 and 10.7 meters per minute) respectively. When the low density polyethylene has softened 0.017 part of a 50/50 low density polyethylene white titanium dioxide pigment concentrate is added and given 5 alternate cuts to incorporate the white pigment. Then 0.00044 part (on a toner basis) of the pigment, prepared as above, is added and the material thoroughly incorporated for about one minute. Then the charge is given five alternate cuts and a center sample taken as described above followed by 10, 15 and 20 alternate cuts with a center sample being taken each time. The 3"×5" (7.2 cm by 12.7 cm) by 20 mil (0.05 cm) exhibits are pressed in a mold and the color strength compared. The tinctorial strength exhibited by the pigment is at least as great as that of commercial resin extended pigments.

EXAMPLE II

A laboratory scale mill is charged with 1500 parts of ¼" (0.127 cm) diameter steel balls, 150 parts roofing nails, 50 parts of crude beta copper phthalocyanine, 33.3 parts of an ethylene/acrylic acid copolymer having a softening point of 108° C. a density of 0.93 g/cc, a Brookfield viscosity at 140° C. of 500 cps (0.5 Pa.s), an acid number of 40 mg KOH/g, and a solubility in acetone at 30° C. of less than 1 g/l, and 8 parts anhydrous sodium sulfate to suppress the explosivity of the resulting product. The mill is rotated at about 74% of its critical speed for 96 hours. The balls and nails are separated with a screen and the dry mill powder recovered. Then two smaller laboratory scale mills are both charged with 600 parts ⅛" (0.32 cm) steel shot, 21.2 parts of the mill powder, and 79 parts of acetone. The mills are sealed and rotated at 75% of the critical speed for 72 hours. The contents of the mills are discharged on a screen which retains the steel shot. The steel shot is washed with additional acetone so that essentially all of the pigment slurry is recovered. Steam is passed through the slurry until the temperature reaches 95° C. After holding the temperature at 95° C. for 10 minutes all of the acetone is removed and the steam is shut off. The slurry is cooled to 85° C., acidified with 52.2 parts of 33% aqueous sulfuric acid and maintained at 80°-85° C. for one hour. The pigment is isolated by filtration, washed with hot water until free of acid and dried. The yield is 37 parts of a blue powder. The product is characterized by outstanding dispersibility in polyvinyl chloride when tested in the following manner. White plasticized soft polyvinyl chloride (22 parts) is mixed with 0.2 part of the resin extended pigment, prepared as above, in a small glass jar by stirring with a spatula and subsequent rolling of the jar for one minute on a roller mill. The resulting mixture is added to 199 parts of white plasticized soft polyvinyl chloride which has been softened by milling for 30 seconds on a two roll mill, the rolls of which are preheated to 150° C. and are rotating at 15 RPM. After 15 seconds of milling the charge is given five alternate cuts, and the material removed from the mill. The removed material is allowed to cool and small exhibits are cut from the center of the resulting sheet. The remainder of the sheet is returned to the mill for an additional 10 alternate cuts and exhibits are similarly prepared. Dispersibility is judged by degree of color development and the degree of speckling and streaking in the exhibit. In all these respects the 40% resin extended product is vastly superior to the product similarly treated without resin, being on an equal toner basis tinctorially stronger at 5 cuts and stronger at 15 cuts. Neither specks nor streaks can be detected in the 15 cut exhibits whereas the resin untreated product shows a multitude of streaks and specks.

In terms of dispersibility the new product is fully equal to currently available commercial 50% resin extended product produced by more elaborate and expensive post particle size reduction processing techniques.

EXAMPLE III

A laboratory scale ball mill is charged with 1500 parts of ½" (1.27 cm) diameter steel balls, 150 parts roofing nails, 45 parts crude 2,9-dimethylquinacridone, and 5 parts crude quinacridone. The charge is milled by rotating the mill for 96 hours at about 70% of the critical speed, after which the contents of the mill are discharged through a screen which retains the steel balls and nails and the dry mill powder recovered.

Another laboratory scale mill is then charged with 600 parts of ⅛ (0.32 cm) steel shot, 13.2 parts of the above mill powder 12.0 parts of an ethylene/acrylic acid copolymer having a softening point of 108° C., a density of 0.93 g/cc, a Brookfield viscosity at 140° C. of 500 cps (0.5 Pa.s), an acid number of 40 mg KOH/g and a solubility in acetone at 30° C. of less than 1 g/l, and 79 parts acetone. The mill is rotated at about 75% of its critical speed for 72 hours, after which the mill is discharged through a screen which retains the steel shot and washed with sufficient additional acetone to collect essentially all of the pigment slurry from the mill. Steam is passed through the slurry with agitation until a temperature of 95° C. is reached. After 10 minutes at 95° C., all of the acetone is removed and the steam is shut off. The slurry is treated with 26 parts of 33% aqueous sulfuric acid and held at 80°-85° C. for one hour. The product is isolated by filtration, washed free of acid with hot water, and dried at 80° C.

The product shows outstanding dispersibility in polyvinyl chloride being at least fully equivalent to commercial products made by a more expensive process. It is vastly superior to a product made in a similar manner but without the resin.

EXAMPLE IV

A laboratory scale ball mill is charged with 1500 parts of ½" (1.27 cm) diameter steel balls, 150 parts roofing nails, 45 parts crude 2,9-dimethylquinacridone, 5 parts crude quinacridone, and 45 parts of an ethylene/acrylic acid copolymer having a softening point of 108° C., a density of 0.93 g/cc, a Brookfield viscosity at 140° C. of 500 cps (.5 Pa.s) an acid number of 40 mg KOH/g, and a solubility in acetone at 30° C. of less than 1 g/l, and 5 parts anhydrous sodium sulfate as a dust explosion suppressor. The charge is milled by rotating the mill for 96 hours at about 70% of the critical speed, after which the contents of the mill are discharged through a screen which retains the steel balls and nails and the dry mill powder recovered.

Another laboratory scale mill is then charged with 600 parts ⅛" (0.32 cm) steel shot, 79 parts acetone and 24 parts of the above mill powder containing the polymer. The mill is rotated at about 75% of its critical speed for 72 hours, after which the mill is discharged through a screen which retains the steel shot and washed with sufficient additional acetone to collect essentially all of the pigment slurry from the mill. Steam is passed through the slurry with agitation until a temperature of 95° C. is reached. After 10 minutes at 95° C., all of the acetone is removed and the steam is shut off. The slurry is treated with 26 parts of 33% aqueous sulfuric acid and held at 80°-85° C. for one hour. The product is isolated by filtration, washed free of acid with hot water, and dried at 80° C.

A product of outstanding dispersibility in plastics is obtained.

EXAMPLE V

A laboratory scale mill is charged with 1500 parts of ½" (1.27 cm) diameter steel balls, 150 parts roofing nails, 50 parts crude 2,9-dichloroquinacridone, 33.3 parts of an ethylene/acrylic acid copolymer having a softening point of 108° C., a density of 0.93 g/cc, a Brookfield viscosity at 140° C. of 500 cps (0.5 Pa.s) an acid number of 40 mg KOH/g, and a solubility in acetone at 30° C. of less than 1 g/liter, and 8 parts anhydrous sodium sulfate as a dust explosion suppressor. The charge is milled by rotating the mill for 96 hours at about 70% of its critical speed after which the contents are discharged through a screen which the steel balls and nails and the dry powder recovered.

A laboratory scale mill is then charged with 600 parts ⅛" (0.32 cm) steel shot, 79 parts acetone, and 21.9 parts of the above mill powder containing the copolymer. The mill is rotated at about 75% of its critical speed for 72 hours, after which the mill is discharged. The collected slurry is stirred and steam passed through it until the temperature reaches 95° C. After 10 minutes at 95° C. all the acetone is removed and the steam is shut off. The slurry is treated with 26 parts of 33% sulfuric acid and held at 80°-85° C. for one hour after which a suspension of 0.36 part 2-phthalimidomethylquinacridone in 15 ml water is added and heating at 80°-85° C. continued for another one half hour. The product is isolated by filtration, washed free of acid with water and dried at 80° C.

The resulting product exhibits outstanding dispersibility and heat stability in plastics.

EXAMPLE VI

Crude semichlorinated copper phthalocyanine pigment containing about 4.5% by weight chlorine is dry milled in the presence of balls and nails to form a small particle size highly aggregated mill powder.

Twelve parts of the resulting mill powder and 8 parts of an ethylene/vinyl acetate copolymer having a softening point of 95° C., a density of 0.92 g/cc, a Brookfield viscosity at 140° C. of 550 cps, (0.55 Pa.s) and an acid number of 14 mg KOH/g and a solubility in acetone at 30° C. of less than 1 g/l, are charged to a laboratory scale ball mill containing 600 parts of ⅛" (0.32 cm) diameter steel shot and 79 parts acetone. The mill is rotated at about 75% of the critical speed for 72 hours and then discharged on a screen. Additional acetone is used to wash the shot so that essentially all of the pigment is recovered. The slurry is agitated and the acetone is distilled by passing steam into the slurry. After the temperature reaches 95° where it is kept for 10 minutes to insure removal of acetone. The slurry is cooled to 80°-85° C., acidified with 26 parts of 33% sulfuric acid and kept at this temperature for one hour. The product is isolated by filtration, washed free of acid with hot water and dried at 80° C. The resulting product exhibits outstanding dispersibility in polyvinyl chloride and polyethylene.

I claim:

1. A process comprising dry premilling a crude organic pigment followed by milling the premilled pigment with shot and from 10 to 75 percent by weight, based on the amount of pigment and resin present of a thermoplastic resin in an organic liquid in which said resin is soluble to an extent of less than 5 g per liter at 30° C. and which wets the surface of the pigment particles and can improve their crystallinity while maintaining said pigment and said resin in a finely divided solid state, and recovering a resin extended pigment of pigmentary particle size.

2. The process of claim 1 wherein the pigment is quinacridone or a derivative thereof or a solid solution of two or more quinacridones or quinacridone derivatives or copper phthalocyanine, or a partially or completely halogenated copper phthalocyanine.

3. The process of claim 2 wherein the resin is a polymer of ethylene containing up to 25 weight percent of a monomer selected from the class consisting of acrylic acid, methacrylic acid, vinyl acetate and oxidized ethylene monomer units.

4. The process of claim 3 wherein the resin is present in the premilling step.

5. The process of claim 4 wherein the resin is comilled with the pigment for at least one hour.

6. The process of claim 5 wherein the amount of resin is about 25 percent by weight to about 50 percent by weight, based on the amount of pigment and resin present.

7. The process of claim 6 wherein the comilling is done at a temperature below 65° C.

8. The process of claim 7 wherein the resin has a softening point of from 80° to 140° C. as determined by ASTM E-28.

* * * * *